United States Patent [19]
Mashimo et al.

[11] Patent Number: 5,717,679
[45] Date of Patent: Feb. 10, 1998

[54] SYSTEM FOR NOISE-FREE DETECTION OF WOBBLES OF OPTICAL DISK PREGROOVES

[75] Inventors: Akira Mashimo, Tokorozawa; Toshiki Shimizu, Tanashi, both of Japan

[73] Assignee: Teac Corporation, Tokyo, Japan

[21] Appl. No.: 670,526

[22] Filed: Jun. 27, 1996

[30]    Foreign Application Priority Data

Jun. 30, 1995  [JP]  Japan .................................. 7-188150
Sep. 25, 1995  [JP]  Japan .................................. 7-271973

[51] Int. Cl.$^6$ .......................................... G11B 7/00
[52] U.S. Cl. ............................................... 369/124
[58] Field of Search ........................... 369/44.35, 44.36, 369/54, 59, 124, 48, 44.26, 44.13

[56]    References Cited

U.S. PATENT DOCUMENTS

| | | | |
|---|---|---|---|
| 5,109,369 | 4/1992 | Maeda et al. | 369/50 |
| 5,570,335 | 10/1996 | Ogata et al. | 369/124 |
| 5,606,544 | 2/1997 | Katsuhara | 369/44.36 |
| 5,631,891 | 5/1997 | Moritsugu et al. | 369/124 |
| 5,631,892 | 5/1997 | Bakx | 369/124 |

FOREIGN PATENT DOCUMENTS 0325330  7/1989  European Pat. Off. .

Primary Examiner—Thang V. Tran
Attorney, Agent, or Firm—Woodcock Washburn Kurtz Mackiewicz & Norris LLP

[57]    ABSTRACT

An apparatus for use with a recordable compact disk having an optically discernible pregroove formed thereon to provide a multiturn spiral track along which data pits are to be formed. Each pregroove turn is partly wobbled to represent addresses. Since wobble detection is easy to be impeded by track eccentricity with respect to the axis of disk rotation, a pair of compensator circuits are connected one to each output of a composite photodetector for eliminating from the photodetector output signal a frequency component due to track eccentricity. Each compensator circuit comprises a variable gain amplifier circuit, and a feedback loop for varying the amplifier gain in inverse proportion to the amplitude of the frequency component due to track eccentricity.

7 Claims, 6 Drawing Sheets

SYSTEM FOR NOISE-FREE DETECTION OF WOBBLES OF OPTICAL DISK PREGROOVES

BACKGROUND OF THE INVENTION

This invention relates generally to rotating disk data transfer devices, and more specifically to those employing as data storage media optical disks such as, typically, recordable compact disks (CD-R) and miniature disks (MD). Still more specifically, the invention deals with means in such data transfer apparatus for noise-free detection of address or absolute time information from wobbles or oscillations included in what are known in the an as pregrooves on the optical disks.

In both CD-Rs and MDs commercially available today, data is, and is to be, written along a pregroove, an optically discernible pattern preformed in the form of a multiturn spiral on the disk. The pregroove is partly "wobbled" to include a series of minute oscillations in each turn of the pregroove. These oscillations are optically detectable and translatable into a periodic electric signal having a frequency representative of the wobble oscillations. Thus the wobble oscillations are variously predetermined to represent the track addresses needed to ascertain the current position of the write beam on the disk. Such information represented by the pregroove wobbles is commonly referred to as "absolute time in the pregroove" (ATIP) in the case of CD-Rs and as "addresses in the pregroove" (ADIP) in the case of MDs.

Difficulties have been encountered in the detection of the pregroove wobbles, due mostly to the possible eccentricity of the optical disk with respect to rotational axis of the turntable, or of the pregroove turns with respect to the rotational axis of the disk. As the beam scans each wobbling part of the pregroove, the outputs from the photodetector may contain not only frequency components representative of the wobbles but also those representative of the eccentricity of the pregroove turns.

Such low frequency noise due to pregroove eccentricity can seriously interfere with the accurate detection of the track addresses from the wobbles.

Such difficulties have become particularly pronounced in disk drives where the beam is positioned on the track through angular adjustments of the objective lens through which the beam falls on the disk.

The reflection of the beam entering the two, for instance, split sections of the photodetector varies in intensity with pregroove eccentricity in such a way that the two outputs from the photodetector are in opposite phase to each other. Consequently, when these two outputs are subsequently directed into a differential amplifier in order to derive the wobble frequency therefrom, the frequency components due to pregroove eccentricity have not been canceled out but remained as noise encumbering the subsequent demodulation of addresses from the differential amplifier output.

SUMMARY OF THE INVENTION

The present invention aims at accurate detection of wobble frequencies from optical disks through elimination of low frequency noise due to track turn eccentricity with respect to the axis of rotation of the disk, among other reasons.

Briefly, the present invention is directed to a rotating disk data transfer apparatus for use with an optical disk of the type having preformed thereon an optically detectable pregroove in the form of a multiturn spiral, the pregroove being at least partly wobbled to represent information such as addresses or absolute time. More specifically, the present invention provides the combination comprising photodetector means for translating into an electric signal a light beam that has been modulated by the pregroove on the rotating disk. The electric signal includes a first frequency component representative of the pregroove wobbles and, possibly, a second frequency component such as that caused by the eccentricity of the pregroove turns with respect to the axis of rotation of the disk, the second frequency component being less in frequency than the first frequency component. The combination further comprises com-pensator means connected to the photodetector means for eliminating the second frequency component from the output from the photodetector means, and demodulator means connected to the compensator means for demodulating the first frequency component of the photodetector output into desired information.

Typically, the compensator means comprises a variable gain amplifier circuit connected to the photodetector means, a lowpass filter connected to the output of the variable gain amplifier circuit for transmitting only the second frequency component, and a feedback circuit connected between the lowpass filter and the variable gain amplifier circuit for controllably varying the gain of the variable gain amplifier circuit in inverse proportion to the amplitude of the second frequency component.

The low frequency noise, whatever its cause may be, can thus be effectively reduced to a harmless level by the feedback of the noise component to the variable gain amplifier circuit. Pregroove wobbles can therefore be accurately detected for correct positional control of the light beam on the disk.

The above and other features and advantages of this invention and the manner of realizing them will become more apparent, and the invention itself will best be understood, from a study of the following description and appended claims, with reference had to the attached drawings showing some preferable embodiments of the present invention.

DESCRIPTION OF THE PREFERRED EMBODIMENTS

Figure 1:
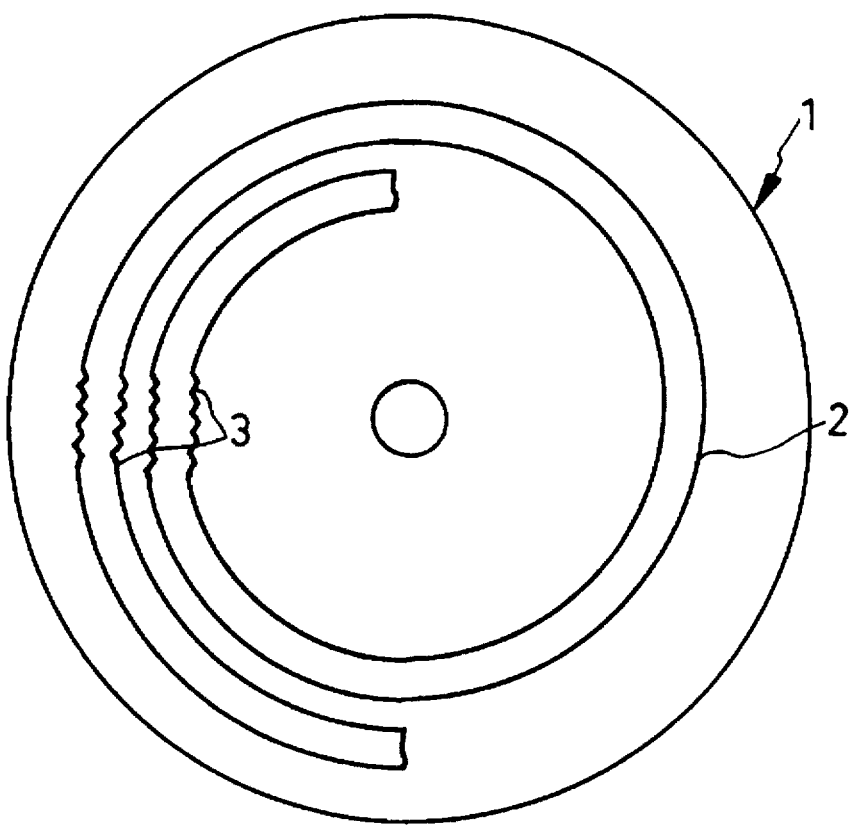
FIG. 1 is a plan view of a CD-R suitable for use in the practice of the present invention, showing in particular the pregroove with wobbling parts on the disk.

The present invention is of particular utility in conjunction with the known CD-R of the write-once, read-manytimes (worm) variety shown in FIG. 1 and therein generally designated 1, among other types of optical disks. The CD-R 1 has a pregroove 2 preformed in the form of a multiturn spiral on one of its major surfaces. The pregroove 2 is shown greatly exaggerated and fragmentarily for illustrative convenience. As is conventional in the art, the pregroove 2 is optically detectable by an associated disk drive, to be set forth presently, enabling the light beam to trace the multiturn spiral and thus providing a track along which data is written. Typically encoded by the known eight to fourteen modulation method, data is written in the form of pits along the pregroove 2 as the disk is driven at a constant linear velocity (CLV).

As is also familiar to the specialists, the pregroove 2 has a wobbling part 3 in each turn of the pregroove spiral in order to represent, by the repetition rate of the pregroove wobbles or oscillations, the address of that turn. Notwithstanding the showing of FIG. 1, however, the pregroove 2 could be wobbled all along its length to represent the ADIP or other desired information or both.

Figure 2:
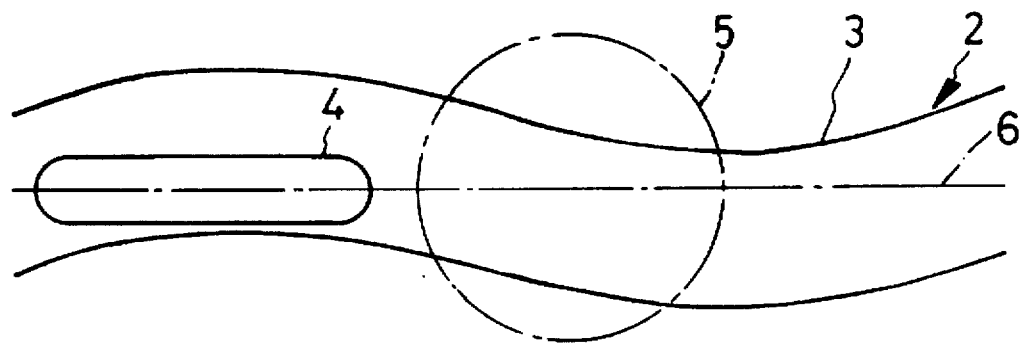
FIG. 2 is a diagram of explanatory nature showing on a greatly enlarged scale the wobbling part of the pregroove on the FIG. 1 disk, together with a light beam spot and a data pit.

As indicated on an enlarged scale in FIG. 2, the data pits 4 are formed in alignment with the centerline 6 of each wobbling part 3, as well as of the rest, of the pregroove 2. With the rotation of the disk 1, the spot 5 of the read beam relatively travels along the pregroove 2 with the beam axis servo-controlled and maintained in constant register with the track centerline 6. Thus, at each wobbling part 3 of the pregroove 2, the beam can be optically modified to provide a frequency modulated signal indicative of the rate of oscillations of the wobbling part and, therefore, of the address of each track turn, as will be detailed subsequently.

Figure 3:
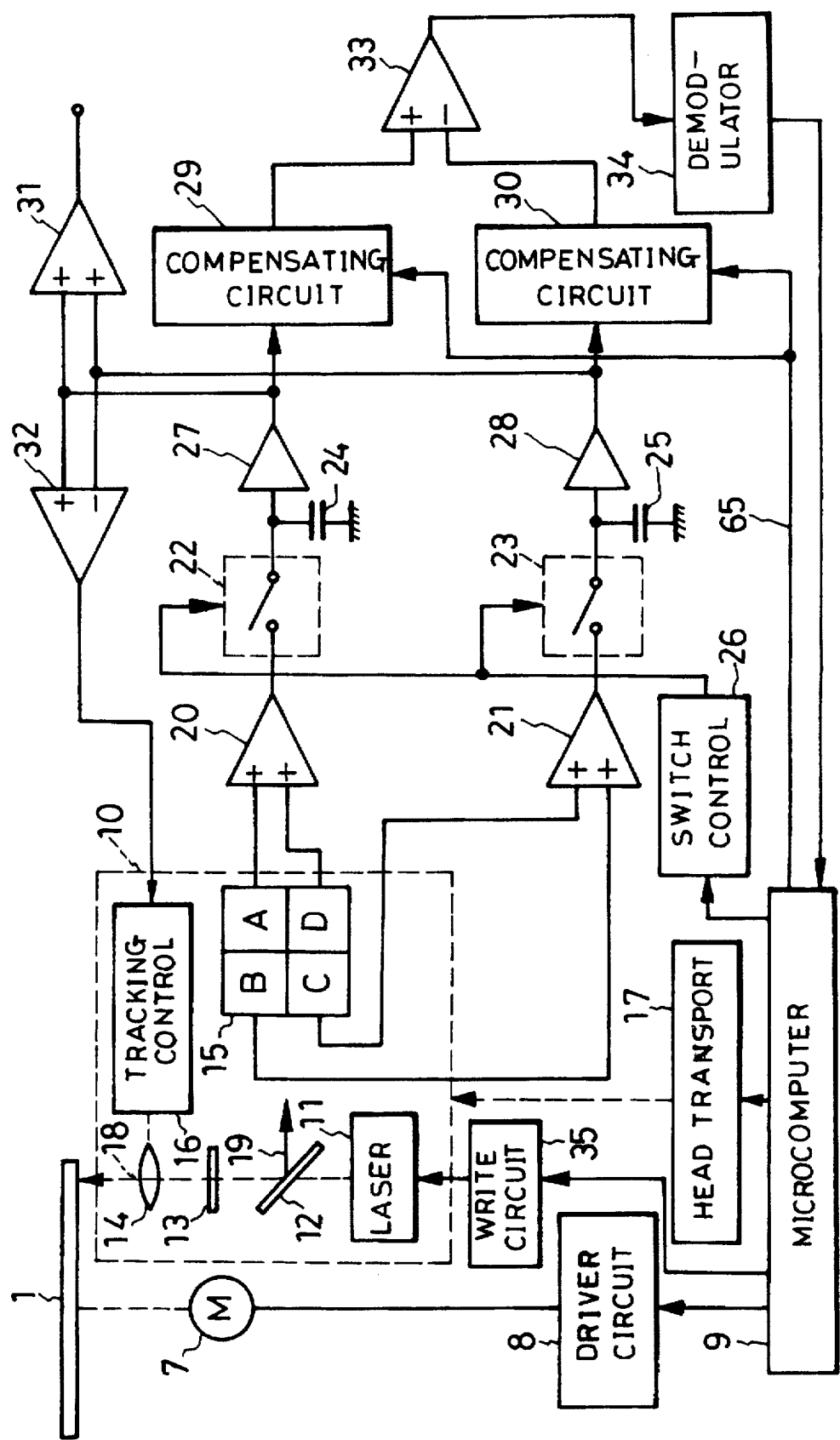
FIG. 3 is a block diagram of a rotating disk data transfer apparatus, for use with the CD-R of FIG. 1, constructed in accordance with the novel concepts of the present invention.

Reference may now be had to FIG. 3 which illustrates by way of example an optical disk drive constructed in accordance with the present invention for use with the CD-R 1 of the above standard design. The exemplified disk drive includes an electric disk drive motor 7 for imparting rotation to the CD-R 1 as this disk is replaceably mounted on a turntable, not shown, in the disk drive. Coupled to a motor driver circuit 8 and thence to a device controller such as a microcomputer 9, the motor 7 drives the disk 1 at CLV.

The reference numeral 10 generally denotes an optical head assembly for both reading and writing data on the disk 1. The head assembly 10 comprises a laser 11, preferably a diode laser, or like light source, a beam splitter 12, a quarter wavelength plate 13, an objective lens 14, a photodetector 15, and a tracking control 16 coupled to the objective 14 for moving the same so as to keep the beam exactly on the track on the disk 1. A head transport 17 is connected between microcomputer 9 and head assembly 10 for moving the latter radially of the disk 1 under the control of the former.

The photodetector 15 is shown to be of the familiar quadruple construction, having four square sections A, B, C and D arranged in two columns and two rows. The quadruple photodetector 15 is so positioned in the head assembly 10 as to be irradiated by the reflection of the read beam from the beam splitter 12, with the boundaries between the photodetector sections A and B and between the sections C and D extending tangentially of the disk track 2.

The light beam from the laser 11 falls on the surface of the disk 1 via the beam splitter 12, quarter wavelength plate 13, and objective 14.

During reading, the reflection 19 of the laser beam from the disk surface falls on the quadruple photodetector 15 after traveling back through the objective 14, quarter wavelength plate 13, and beam splitter 12. The spot of the reflected read beam thus created on the photodetector sections A-D will variously change in pattern and position to provide information on tracking and addresses and change also in intensity to represent the read data recovered from the disk.

The two photodetector sections A and D are both electrically connected to an adder 20, and the other two sections B and C to another adder 21. The outputs of the adders 20 and 21 are connected to on-off switches 22 and 23 and thence to capacitors 24 and 25, respectively. Coupled between microcomputer 9 and switches 22 and 23, a switch control 26 holds the switches closed during reading and, during writing, open when the beam is falling on the disk 1 and closed when no beam is falling thereon.

The voltages on the capacitors 24 and 25 are impressed via buffer circuits 27 and 28 to compensating circuits 29 and 30, respectively. As will be later detailed with reference to FIG. 4, the compensating circuits 29 and 30 are constructed in accordance with the present invention to eliminate noise due to the possible eccentricity of the disk track, as well as other low frequency noise, that may be contained in the photodetector outputs. The outputs of the buffer circuits 27 and 28 are additionally conventionally coupled to an adder 31 for providing a read data output and to a differential amplifier 32 for providing a tracking signal. This tracking signal is applied to the tracking control 16 of the head assembly 10, enabling the tracking control to move the objective 14 so as to maintain the beam spot 5, FIG. 2, in centerline alignment with the pregroove 2.

The outputs of the compensator circuits 29 and 30 are both connected to a differential amplifier 33 whereby a noise-free wobble signal is obtained. The wobble signal contains the addresses of the track turns in terms of frequencies. Inputting this wobble signal from the differential amplifier 33, a demodulator circuit 34 demodulates the frequencies of the wobble signal into address information, for delivery to the microcomputer 9.

During writing a write circuit 35 controls the laser 11 to modulate the laser beam according to the data to be written that has been input from the microcomputer 9. The compensating circuits 29 and 30 participate in feedback control for noise-free wobble detection during reading and function as fixed gain circuits during writing.

The two compensating circuits 29 and 30 are identical in construction, so that the detailed description of one applies to the other. As diagramed in detail in FIG. 4, each compensating circuit 29 and 30 includes a variable gain amplifier circuit 41 to which there is connected the output line 40 of the buffer circuit 27 or 28. The variable gain amplifier circuit 41 includes an operational amplifier 43 having a noninverting input connected to the buffer circuit output line 40 via a resistor 42. This noninverting input is also grounded via a capacitor 44 which is intended for removal of high frequency noise and for prevention of oscillation.

The output of the operational amplifier 43 is connected via a 10 kilohm feedback resistor 45 to its inverting input, which is further connected via another 10 kilohm resistor 46 to a reference voltage terminal 47. Preferably, the supply voltage+Vcc of the operational amplifier 43 is 5.0 volts, and the reference voltage Vref on the terminal 47 is 2.1 volts, somewhat less than half the supply voltage+Vcc.

Connected to the output of the operational amplifier 43, or of the variable gain amplifier circuit 41, is an output detector line 48 having an output detector circuit in the form of a voltage divider comprised of a 10 kilohm resistor 49 and a 51 kilohm resistor 50. A one microfarad capacitor 51 is connected in parallel with the resistor 50 to provide a lowpass filter having a cutoff frequency of 10 to 20 hertz. The cutoff frequency of this lowpass filter is defined as:

$$f=1/[\{2\pi(R_1 \cdot R_2)/(R_1+R_2)\} \times C]$$

where f=cutoff frequency $R_1$=value of resistor 49

$R_2$=value of resistor 50

C=capacitance of capacitor 51.

The connection between the resistors 49 and 50 is coupled via a 10 kilohm resistor 54 to the inverting input of an operational amplifier 53. This operational amplifier has a noninverting input connected to a 2.1 volt reference voltage terminal 55, and an output connected to the inverting input via 330 kilohm feedback resistor 56. The operational amplifier together with the resistors 54 and 56 and the reference voltage terminal 55 makes up an inverting amplifier circuit 52.

The variable gain amplifier circuit 41 additionally comprises a field effect transistor 57 for controlling its gain by the inversion of the output from the lowpass filter comprising the capacitor 51. The FET 57 has a gate G connected to the output of the operational amplifier 53 via a 220 kilohm resistor 58, a drain D connected to the inverting input of the noted operational amplifier 43 via a one kilohm resistor 59 and a selector switch 60, and a source S connected to a 2.1 volt reference voltage terminal 61. A diode 62 is shown connected between gate and source of the FET 57 by way of protection.

The selector switch 60 has a movable contact connected to the inverting input of the operational amplifier 43, a read or playback contact P connected to the FET 57 via the resistor 59, and a write or record contact R connected to a 2.1 volt reference voltage terminal 64 via a resistor 63. The movable contact of the selector switch 60 responds to a read/write select signal supplied from the microcomputer 9, FIG. 3, over a line 65, engaging the contact R during writing and the contact P during reading.

Operation

Figure 5:
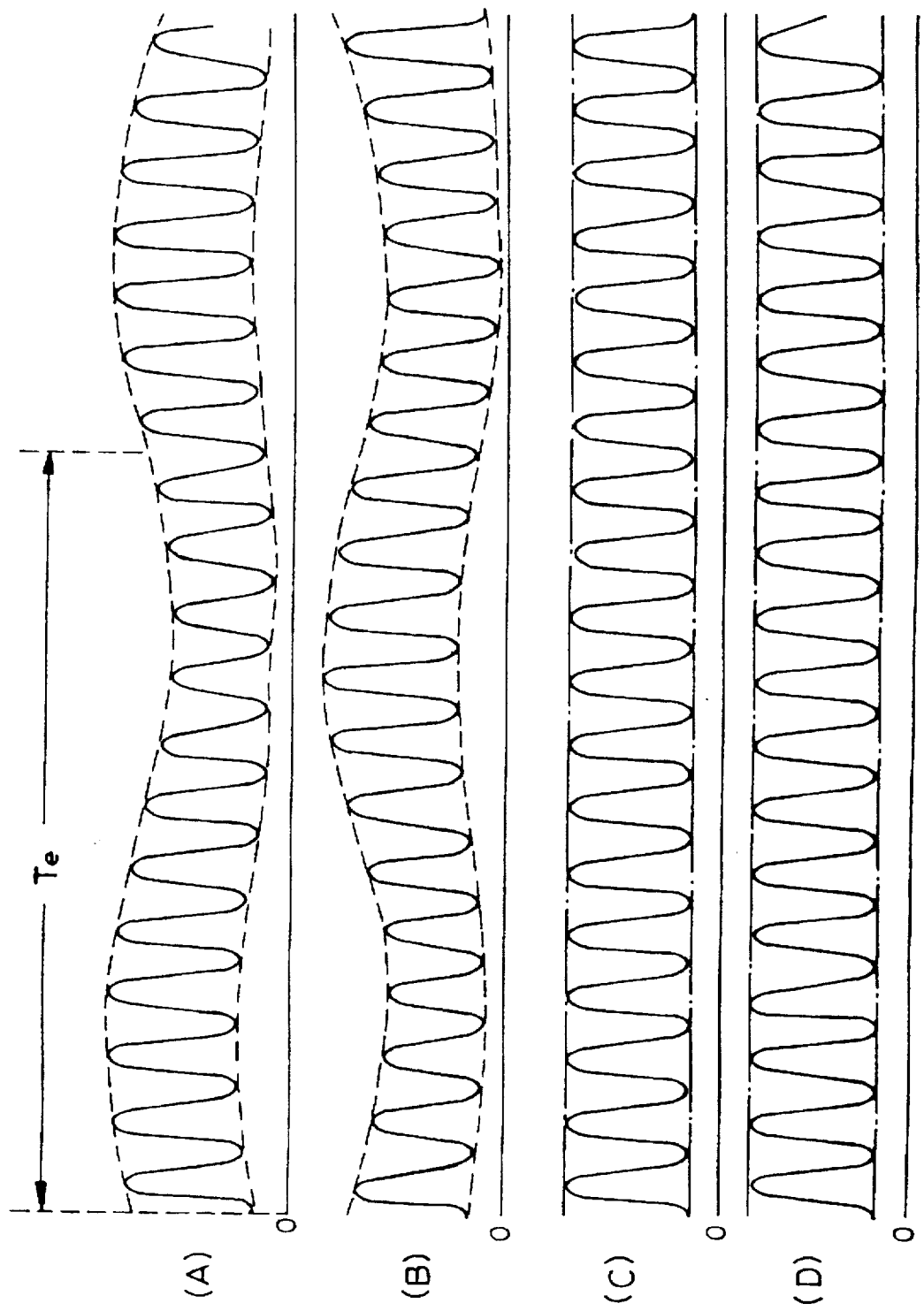
FIG. 5, consisting of (A) through (D), is a set of waveform diagrams useful in explaining the operation of the FIG. 3 apparatus.

The photodetector outputs delivered to the compensator circuits 29 and 30 during reading of the data pits 4 on the disk 1 are subject to change in amplitude depending upon the possible eccentricity of the disk with respect to the unshown turntable, or of the disk track with respect to the disk itself. At (A) and (B) in FIG. 5 are shown the waveforms of the read data signals input to the compensator circuits 29 and 30 when there is such eccentricity, and at (C) and (D) those of similar signals in the absence of such eccentricity. The waveforms of FIG. 5 are all plotted on the assumption that the read data signals represent, by the waveforms indicated by the solid lines, the data pits 4 in the nonwobbling parts of the pregroove 2; therefore, no frequency components due to the pregroove wobbles are indicated in these diagrams.

The read data signals will be of constant amplitude, as at (C) and (D) in FIG. 5, if the read beam spot 5 scans the track exactly along the track centerline 6, provided, of course, that the data pits 4 have been preformed in exact alignment with the track centerline. The read datasignals will vary in amplitude if the disk track is eccentric with respect to the axis of rotation of the disk. At (A) and (B) in FIG. 5 are shown the variations in amplitude due to track eccentricity by the dotted envelopes of the read data signals. The double headed arrow in FIG. 5 indicates one cycle of the amplitude variations.

The frequency of the amplitude variations due to track eccentricity is not constant, however, because the CD-R 1, being assumed to be driven at CLV in the illustrated embodiment, does not rotate at a constant speed. Experiment has proved that the amplitude variations take place with a frequency ranging from three to 50 hertz. The amplitude variations of the two inputs to the compensator circuits 29 and 30, corresponding respectively to the sums of the outputs from the photodetector sections A and D and of the outputs from the photodetector sections B and C, are opposite in phase to each other, as at (A) and (B) in FIG. 5.

Assume that the compensator circuits 29 and 30 were not provided, as has been the case heretofore, and that the photodetector outputs were delivered directly from the buffer circuits 27 and 28 to the differential amplifier 33. The resulting output from this differential amplifier would then contain both a frequency component representative of pregroove wobbles and that due to track eccentricity, making it impossible in the worst case to detect the track addresses.

In order to overcome this weakness of the prior art, the compensator circuits 29 and 30 are provided according to the present invention to remove the frequency components due to track eccentricity from the photodetector outputs. The compensator circuits 29 and 30 process the input signals shown at (A) and (B) in FIG. 5 into those depicted at (C) and (D) in the same figure, through the procedure set forth hereinbelow with particular reference to FIG. 4.

In each compensator circuit the movable contact of the selector switch 60 engages the fixed contact P during reading in response to the signal from the microcomputer 9 thereby completing the feedback circuit for the variable gain amplifier 43. The frequency component that may be contained in the input to each compensator circuit 29 or 30 because of track eccentricity is derived by the lowpass filter comprising the resistors 49 and 50 and the capacitor 51. The derived frequency component is inverted in phase by the inverting amplifier circuit 52 and then applied to the gate of the FET 57.

Let it be supposed that the voltage across the resistor 50 has now risen because of track eccentricity. Then the output from the inverting amplifier circuit 52 will drop, and so will the gate voltage of the FET 57. The resistance between drain and source of this FET will then rise thereby causing a decrease in the gain of the variable gain amplifier circuit 41. The undesired amplitude variations of the input signals, FIGS. 5(A) and 5(B), can thus be corrected into the constant amplitude signals of FIGS. 5(C) and 5(D), provided that the signals do not contain frequency components due to pregroove wobbles.

The compensator input signals may of course do contain frequency components representative of pregroove wobbles. Such frequency components are very much higher than those due to track eccentricity, say, 22.05 kilohertz. The compensator circuits 29 and 30 are unresponsive to high frequencies, permitting them to travel therethrough without being in any way modified in so doing.

Figure 6:
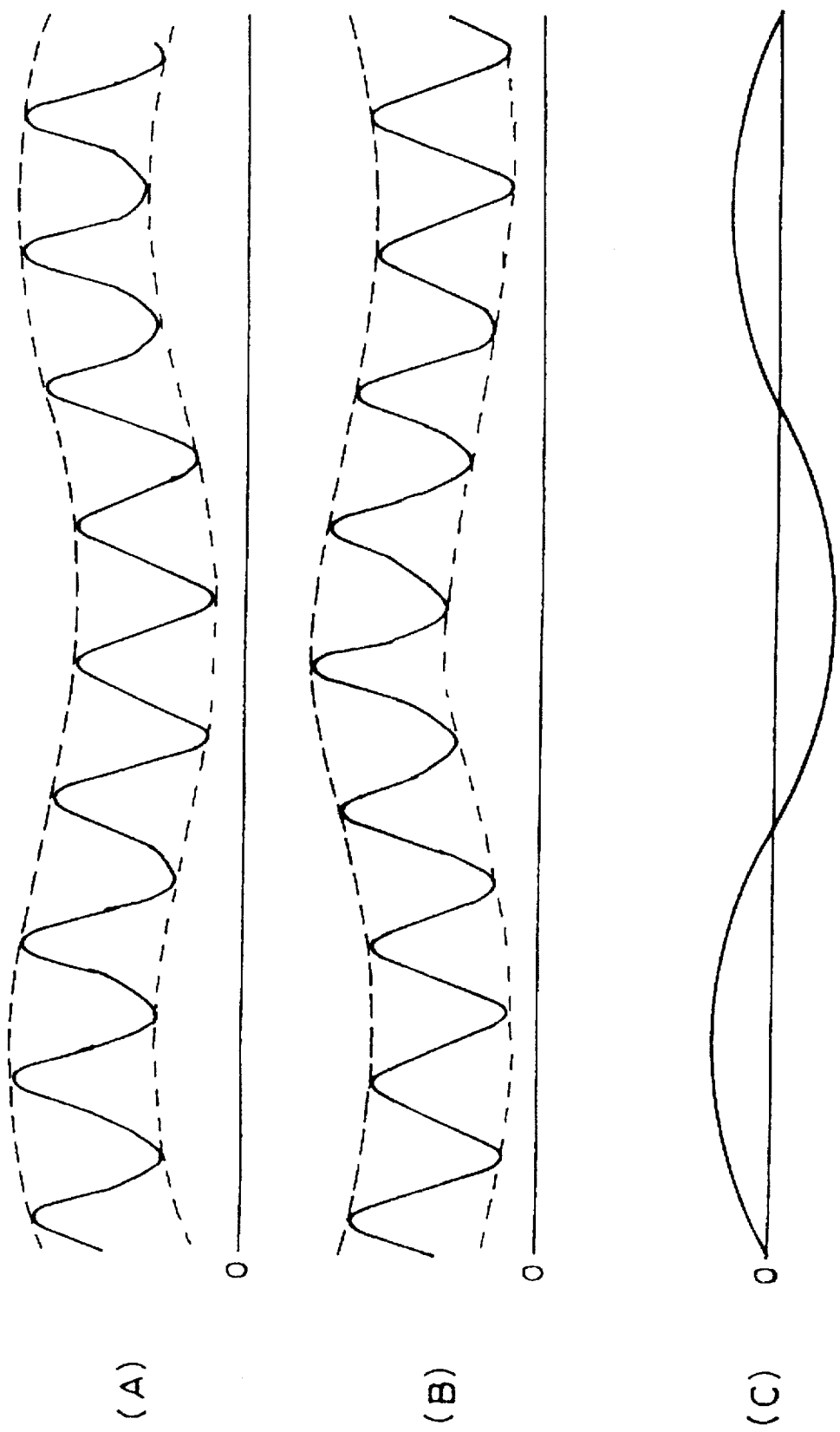
FIG. 6, consisting of (A) through (C), is another set of waveform diagrams useful in explaining the operation of the FIG. 3 apparatus.

At (A) and (B) in FIG. 6 are shown the input signals to the differential amplifier 33 that have been processed by the compensator circuits 29 and 30 and which contain frequency components due to pregroove wobbles, and at (C) the corresponding output therefrom. Being free from frequency components due to track eccentricity, the FIG. 6(C) signal will provide correct address information when subsequently processed by the demodulator circuit 34.

Writing on the CD-R 1 becomes ready when the desired address thereon is found as above. The write circuit 35 controls the diode laser 11 to cause the modulated write beam to create pits along the track defined by the pregroove 2 on the disk.

Since the disk 1 must be driven at CLV during writing, too, the microcomputer 9 needs to know the current beam position on the disk through wobble detection. This necessity is achieved according to the prior art by projecting a low intensity read beam to the disk when a high intensity write beam is not required for pit creation. The pre-groove wobbles are sensed by the read beam, translated into addresses through the procedure set forth above, and thus utilized for CLV driving of the disk. In conformity with such alternate projection of write and read beams during writing, the switches 22 and 23 are both held open only during write beam projection, being closed during read beam projection. The gain of the amplifier circuit 41 of each compensator circuit is fixed during writing as the movable contact of the selector switch 60, FIG. 4, engages the fixed contact R under the control of the microcomputer 9.

Alternate Form

Figure 4:
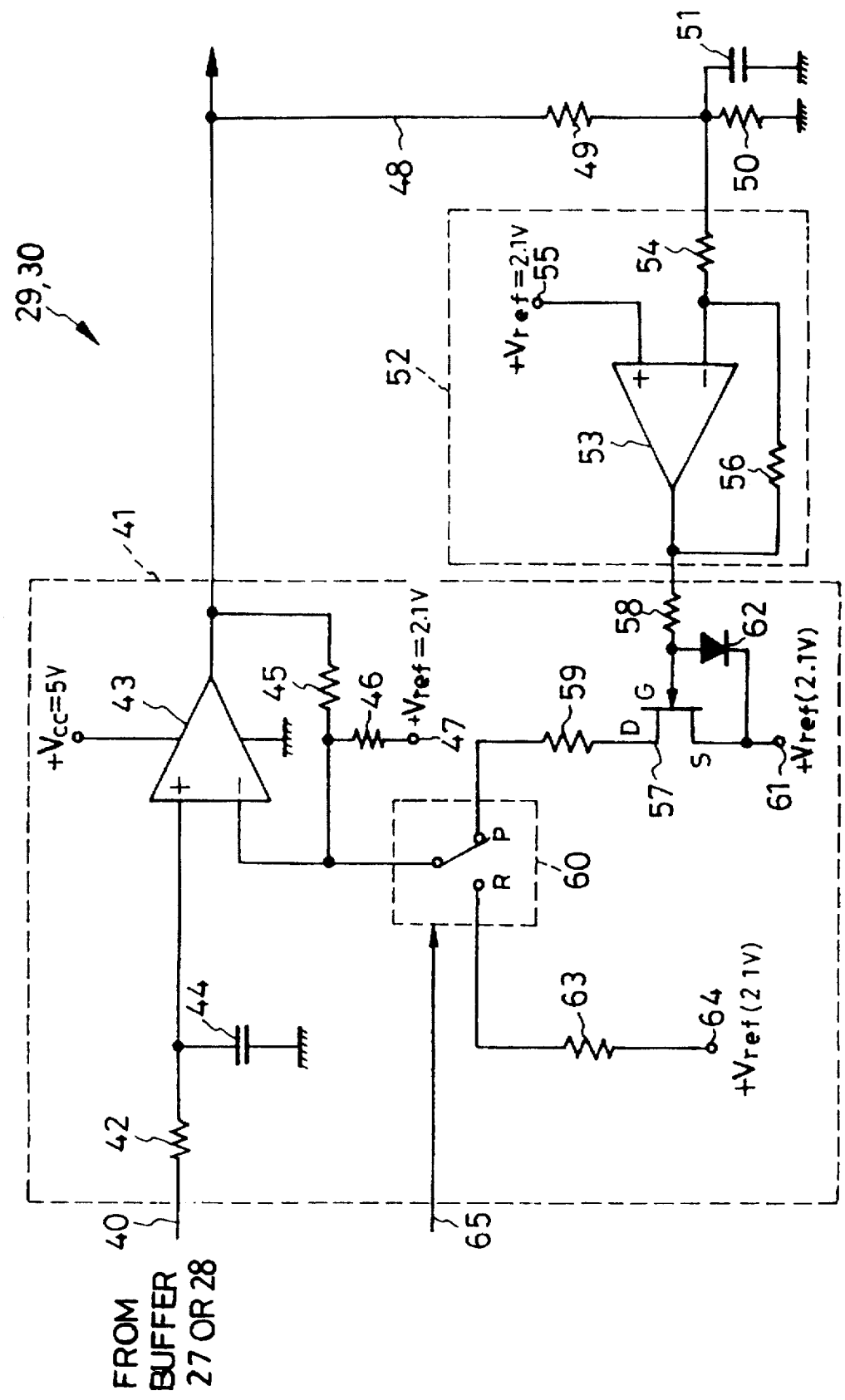
FIG. 4 is a diagram showing in detail each of two compensator circuits in the FIG. 3 apparatus.
Figure 7:
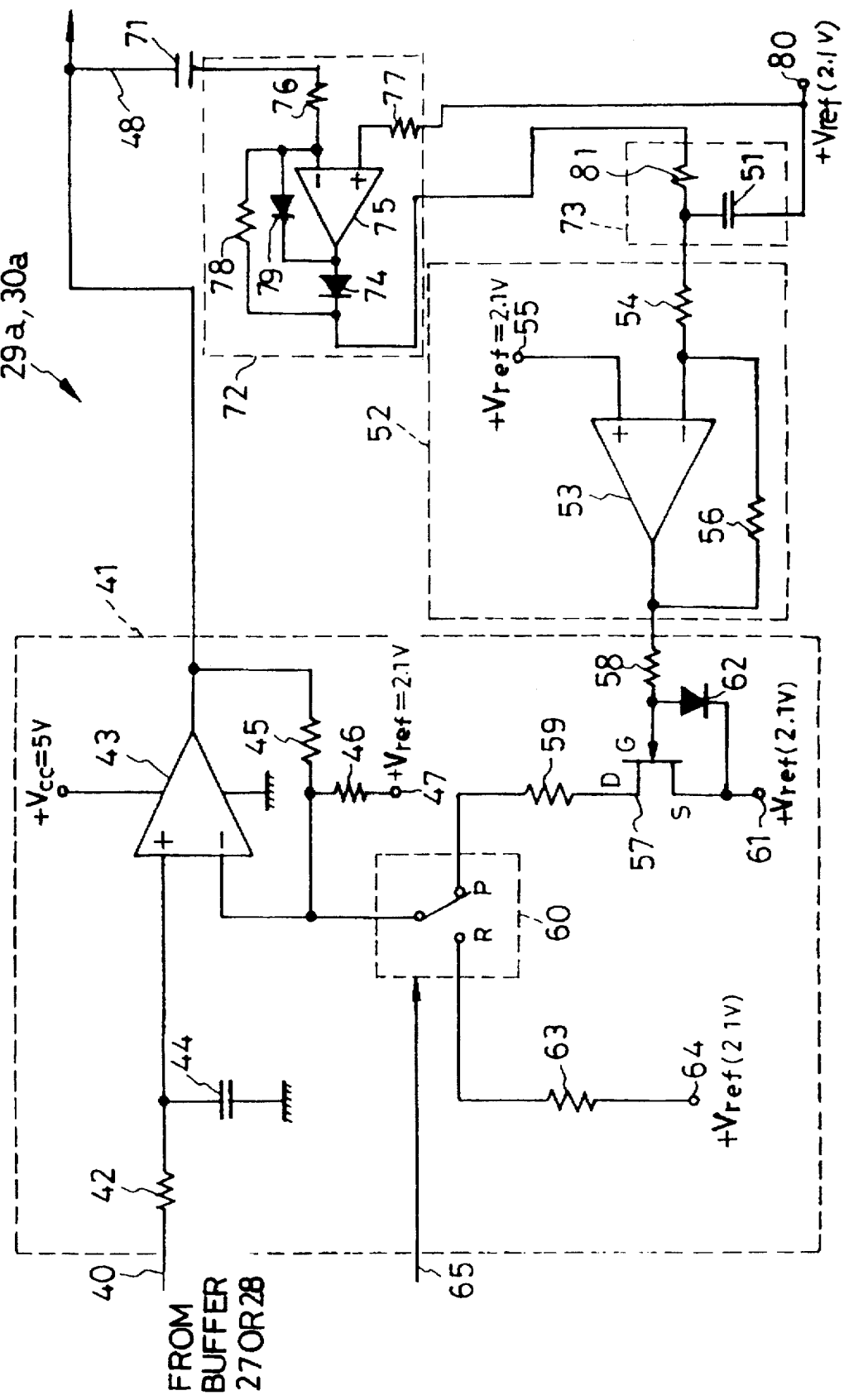
FIG. 7 is a circuit diagram of a modified compensator circuit.

The compensator circuits 29 and 30 of FIG. 4 may be modified as indicated at 29a and 30a in FIG. 7. Each modified compensator circuit features a coupling capacitor 71, a detector circuit 72, and a lowpass filter 73, all connected between the output of the variable gain amplifier circuit 41 and the input of the inverting amplifier circuit 52. The coupling capacitor 71 is connected to the output line 48 of the variable gain amplifier circuit 41. Its capacitance is 0.1 microfarad in this particular embodiment.

The detector circuit 72 includes an operational amplifier 75 having a negative input connected to the coupling capacitor 71 via a one kilohm resistor 76, a positive input connected to a 2.1 volt reference voltage terminal 80 via a 680 ohm resistor 77, and an output connected to a rectifying diode 74 and thence to the lowpass filter 73. The detector circuit 72 further comprises a two kilohm feedback resistor 78 connected between the cathode of the diode 74 and the negative input the nee operational amplifier 75, and another diode 79 connected between the negative input and output of the operational amplifier 75.

The detector circuit 72 could be comprised of only the diode 74. It has a nonlinear characteristic, however, not becoming conductive until its forward voltage is exceeded. This weakness of the diode is overcome by additionally providing the operational amplifier 75 and feedback resistor 78. The operational amplifier 75 could be noninverting, instead of being inverting as shown.

The lowpass filter 73 comprises a 0.22 microfarad smoothing capacitor 51 connected to the reference voltage source 80, and a 10 kilohm resistor 81 connected between the output of the detector circuit 72, or the cathode of the diode 74, and the capacitor 51, The output of the lowpass filter 73 is connected to the inverting amplifier circuit 52 of the same construction as that of the preceding embodiment shown in FIG. 4. The variable gain amplifier circuit 41 is also akin in construction to that shown in FIG. 4.

In operation the coupling capacitor 71 of each modified compensator circuit 29a or 30a functions to derive an alternating current component from the output from the associated variable gain amplifier circuit 41. The alternate current component is then rectified and directed into the lowpass filter 73. The capacitor 51 of the lowpass filter 73 provides a voltage similar to that obtained by the FIG. 4 capacitor, so that low frequency noise can be removed from the photodetector outputs as in the FIGS. 3–6 embodiment.

Notwithstanding the foregoing detailed disclosure it is not desired that the present invention be limited by the exact showing of the drawings or the description thereof. For example, a dual photodetector could be employed in lieu of the quadruple photodetector 15, FIG. 3. In this case, however, the two adders 20 and 21 might be omitted, and two current to voltage converters might instead be provided respectively between the dual photodetector and the switches 22 and 23. It is therefore appropriate that the invention be construed broadly and in a manner consistent with the fair meaning or proper scope of the claims which follow.

What is claimed is:

1. In a rotating disk data transfer apparatus for use with an optical disk of the type having preformed thereon an optically detectable pregroove in the form of a multiturn spiral, the pregroove being at least partly wobbled to represent information such as addresses or absolute time, in combination:

(a) drive means for imparting rotation to the disk about a predetermined axis;

(b) light some means for projecting a light beam thereby to trace the pregroove on the rotating disk;

(c) photodetector means for translating into an electric signal the light beam that has been modulated by the pregroove on the rotating disk, the electric signal including a first frequency component representative of the pregroove wobbles and, possibly, a second frequency component such as that caused by the eccentricity of the pregroove turns with respect to the axis of rotation of the disk, the second frequency component being less in frequency than the first frequency component;

(d) compensator means connected to the photodetector means for eliminating the second frequency component from the output from the photodetector means; and (e) demodulator means connected to the compensator means for demodulating the first frequency component of the photodetector output into desired information.

2. The rotating disk data transfer apparatus of claim 1 wherein the compensator means comprises:

(a) a variable gain amplifier circuit connected to the photodetector means;

(b) a lowpass filter connected to an output of the variable gain amplifier circuit for transmitting only the second frequency component; and (c) a feedback circuit connected between the lowpass filter and the variable gain amplifier circuit for controllably varying the gain of the variable gain amplifier circuit in inverse proportion to the amplitude of the second frequency component.

3. The rotating disk data transfer apparatus of claim 2 wherein the compensator means further comprises:

(a) a coupling capacitor connected to the variable gain amplifier circuit for deriving an alternating current component from an output therefrom; and (b) a detector circuit connected between the coupling capacitor and the lowpass filter.

4. In a rotating disk data transfer apparatus for use with an optical disk of the type having preformed thereon an optically detectable pregroove providing a multiturn spiral track along which data is, or is to be, formed in the form of pits, the pregroove being at least partly wobbled to represent information such as addresses or absolute time, in combination:

(a) drive means for imparting rotation to the disk about a predetermined axis;

(b) light source means for projecting a light beam thereby to trace the pregroove on the rotating disk;

(c) photodetector means for translating into an electric signal the light beam that has been modulated by the disk, the electric signal including a first component representative of the data pits on the disk and a second component representative of the pregroove wobbles;

(d) variable gain amplifier means connected to the photodetector means;

(e) lowpass filter means connected to an output of the variable gain amplifier means for transmitting frequencies below a cutoff frequency less than frequencies of the first and the second signal components representative of the data pits and of the pregroove wobbles;

(f) feedback circuit means connected between the lowpass filter means and the variable gain amplifier means for controllably varying the gain of the variable gain amplifier means in inverse proportion to the amplitude of a signal that has passed through the lowpass filter means; and (g) demodulator means connected to the variable gain amplifier means for demodulating the second component of the photodetector means output into desired information.

5. The rotating disk data transfer apparatus of claim 4 further comprising:

(a) a coupling capacitor connected to the variable gain amplifier means for deriving an alternating current component from an output therefrom; and (b) a detector circuit connected between the coupling capacitor and the lowpass filter means.

6. In a rotating disk data transfer apparatus for use with an optical disk of the type having preformed thereon an optically detectable pregroove providing a multiturn spiral track along which data is, or is to be, formed in the form of pits, the pregroove being at least partly wobbled to represent information such as addresses or absolute time, in combination:

(a) drive means for imparting rotation to the disk about a predetermined axis;

(b) light source means for projecting a light beam thereby to trace the pregroove on the rotating disk;

(c) a composite photodetector for providing at least two electric signals in response to the light beam that has been modulated by the disk, each electric signal including a first component representative of the data pits on the disk and a second component representative of the pregroove wobbles;

(d) a pair of variable gain amplifier circuits connected to the photodetector for amplifying the respective output signals therefrom;

(e) a pair of lowpass filters connected one to an output of each variable gain amplifier circuit for transmitting frequencies below a cutoff frequency less than frequencies of the first and the second signal components representative of the data pits and of the pregroove wobbles;

(f) a pair of feedback circuits connected one between each lowpass filter and each variable gain amplifier circuit for controllably varying the gain of the variable gain amplifier circuit in inverse proportion to the amplitude of a signal that has passed through the lowpass filter;

(g) a differential amplifier having inputs connected to outputs of the variable gain amplifiercicuits; and (h) a demodulator connected to the differential amplifier for demodulating an output therefrom into desired information represented by the pregroove wobbles.

7. The rotating disk data transfer apparatus of claim 6 further comprising:

(a) a pair of coupling capacitors connected one to each variable gain amplifier circuit for deriving an alternating current component from an output therefrom; and (b) a pair of detector circuits connected one between each coupling capacitor and each lowpass filter.

* * * * *